United States Patent [19]

Lew

[11] 3,884,456
[45] May 20, 1975

[54] SELF-ATTACHING COUPLING SPRING FOR THE COUPLED CHOPSTICKS

[76] Inventor: Hyok Sang Lew, 1620 E. Blacklidge Dr., No. 6, Tucson, Ariz. 85719

[22] Filed: Dec. 26, 1973

[21] Appl. No.: 427,805

[52] U.S. Cl. ............................................ 267/156
[51] Int. Cl. ............................................ F16e 1/12
[58] Field of Search .................... 267/155, 156, 157

[56] References Cited
UNITED STATES PATENTS

| | | | |
|---|---|---|---|
| 2,823,413 | 2/1958 | Steward | 267/155 |
| 3,446,529 | 5/1969 | Mills | 267/155 |

*Primary Examiner*—James B. Marbert

[57] ABSTRACT

A self-attaching coupling spring for coupling a pair of elongated members in a resilient manner is disclosed. The coupling spring is formed by a pair of coil springs similar to the coil spring used in safety pins. Both ends of the coil spring are extended to form a pair of arms extending therefrom. The ends of the pair of arms included in each coil are bent away from each other over an angle significantly greater than 90 degrees. The coils of pair of the coil springs are clamped together to form the coupling spring having four arms extending from the center coil in a symmetrical configuration, in which configuration bent ends of two adjacent arms belonging to two different coil springs point toward one other. A pair of holes constituting an angle approximately equal to 45° with respect to the axis of the elongated member with their ends pointing toward one another are disposed within each of the pair of elongated members. These holes are separated from one another by a distance slightly less than twice of the length of the arms included in the coupling spring. Two adjacent arms of the coupling spring have to be spreaded away from one another when their ends are made to engage these holes. The bent ends of the first two adjacent arms of the coupling spring, each of which arms belongs to each of the pair of coil springs forming the coupling spring, engage holes disposed within the first elongated member. The bent ends of other pair of arms of the coupling spring engage holes disposed within the second elongated member. The torque tending to restore the neutral position for the arms of the coupling spring restrains the bent ends of those arms from disengaging from holes disposed within the elongated members.

6 Claims, 6 Drawing Figures

SELF-ATTACHING COUPLING SPRING FOR THE COUPLED CHOPSTICKS

The present invention relates to a coupling spring for coupling a pair of elongated members in a resilient manner, and more particularly, to the coupling spring used in the coupled chopsticks.

The coupled chopsticks is formed by a pair of elongated members coupled to one another by a coupling spring, which coupling spring includes four arms extending from the central coil spring. Each pair of the arms of the coupling spring are affixedly secured to each of the pair of elongated members. Thereby, one end of the pair of elongated members coupled by the coupling spring can be squeezed together to grasp food as the resilience of the coupling spring permits a pivotal movement of the elongated members about the axis of the central coil spring included in the coupling spring. In manufacturing the coupled chopsticks, it is often desirable to use the coupling spring made of stainless steel and the elongated members made of aluminum alloy. The problem of bonding the stainless steel to the aluminum alloy poses a serious difficulty because of the large difference in the melting points of these metals. Although these metals can be glued together, using a glue in manufacturing an eating utensil is undesirable and impractical.

It is therefore a primary object of the present invention to provide a self-attaching coupling spring for the coupled chopsticks.

Another object of the present invention is to provide a coupling spring for the coupled chopsticks, which is easy to replace.

Further object of the present invention is to provide a coupling spring for the coupled chopsticks, which can be attached to chopsticks made of any material without using any thermal or chemical means of bonding.

These and other objects of the present invention will become apparent to those skilled in the art as the description thereof proceeds.

The present invention may be described with greater specificity and clarity with reference to the following figures.

Figure 1:
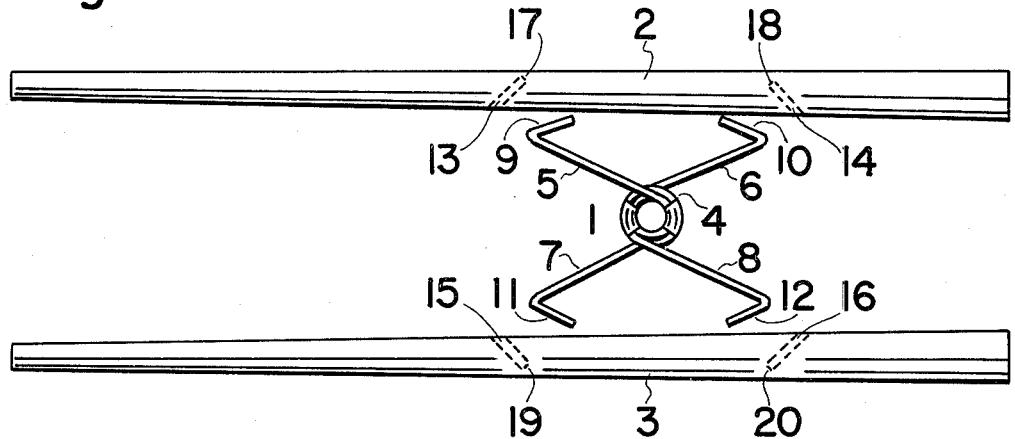
FIG. 1 illustrates a top view of the coupling spring of the present invention for coupling a pair of elongated members shown alongside of the coupling spring.

Referring to FIG. 1, there is shown coupling spring 1 of the present invention alongside of a pair of elongated members 2 and 3, which elongated members are to be coupled to one another by coupling spring 1. The coupling spring 1 includes a central coil spring 4 and four arms 5, 6, 7 and 8 extending therefrom. The arms 5, 6, 7 and 8 are aligned on the same plane normal to the axis of coil spring 4 and disposed in such a way that the angle between any two adjacent arms is approximately equal to 90°. The resilient force provided by central coil spring 4 maintains arms 5, 6, 7 and 8 in their neutral position as shown in FIG. 1. The coil spring 4 exerts a torque tending to restore the neutral position for the arms 5, 6, 7 and 8 when any of these arms are pivoted relative to other about the axis of central coil spring 4. The end 9 of arm 5 and end 10 of arm 6 are bent toward one another. The end 11 of arm 7 and end 12 of arm 8 are bent toward one another, too. In general, the angle between the bent end of an arm and the arm itself should be approximately equal to 45°. It may be understood that bent ends 9, 10, 11 and 12 should be aligned on the same plane as that defined by arms 5, 6, 7 and 8. A pair of holes 13 and 14 constituting an angle approximately equal to 45° with respect to the axis of elongated member 2 with their ends 17 and 18 pointing toward one another are disposed within elongated member 2. The distance between holes 13 and 14 is slightly less than the sum of lengths of arms 5 and 6. For the sake of good appearance, it is desirable not to drill holes 13 and 14 all the way through the elongated member 2. The elongated member 3 includes similarly disposed holes 15 and 16. It is desirable to make the lengths of bent ends 9, 10, 11 and 12 slightly less than the depths of holes 13, 14, 15 and 16 for the facile engagements therebetween.

Figure 2:
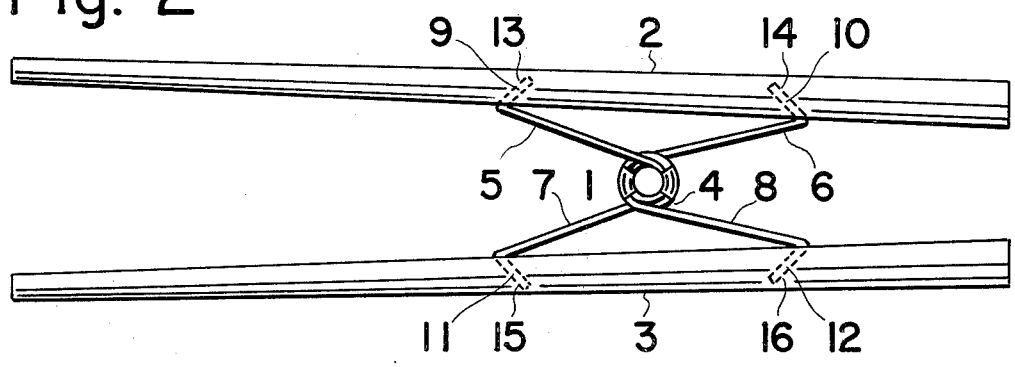
FIG. 2 illustrates the pair of elongated members coupled to each other by the coupling spring of the present invention.

In FIG. 2, there is illustrated the pair of elongated members 2 and 3 coupled by coupling spring 1 of the present invention. The bent end 9 is forced into hole 13 and then the bent end 10 is forced into hole 14 after forcibly spreading arm 6 away from arm 5 till the bent end 10 is brought to a position where the engagement between bent end 10 and hole 14 is executable. The bent ends 11 and 12 are similarly forced into holes 15 and 16, respectively. The resilient torque resulting from the spreading of arms made in the process of attaching coupling spring 1 to elongated members 2 and 3 restrains the bent ends 9, 10, 11 and 12 from disengaging from holes 13, 14, 15 and 16, respectively.

The distance separating two elongated members 2 and 3 is determined by the distance between holes 13 and 14 and that between 15 and 16 relative to the lengths of arms 5, 6, 7 and 8. Therefore, the distance separating two elongated members 2 and 3 can be set to a desired value by selecting an appropriate distances between holes 13 and 14, and 15 and 16. In constructing a coupled chopsticks, it is often desirable to couple elongated members 2 and 3 in a none-parallel configuration within the plane defined by four arms 5, 6, 7 and 8 of coupling spring 1. Such a configuration can be achieved by using a coupling spring having resilient torque on arms 5 and 7 greater than that on arms 6 and 8 or by using a coupling spring with arms 5 and 7 having lengths different from that of arms 6 and 8.

Figures 3, 4:
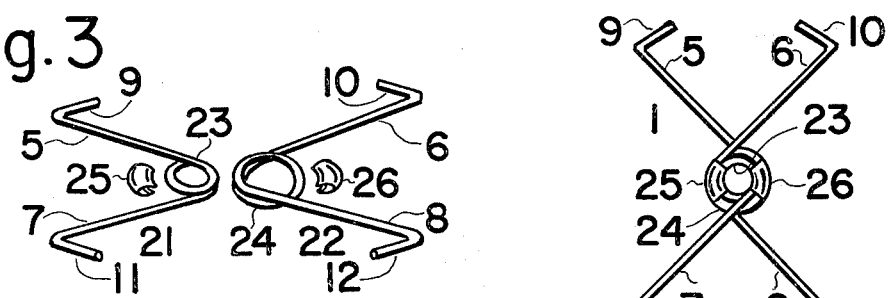
FIG. 3 illustrates an exploded view of the assembling of the coupling spring of the present invention.
FIG. 4 illustrates the assembled coupling spring of the present invention.

The coupling spring 1 of the present invention is formed by a pair of coil springs 21 and 22 illustrated in FIG. 3. The coil spring 21 is formed with one or more coils 23, the ends of which extend therefrom as arms 5 and 7. Arms 5 and 7 extend from opposite sides of coil 23. It is desirable to make the angle between arm 5 and 7 greater than 90° and less than 180°. End 9 of arm 5 and end 11 of arm 7 are bent away from one another over an angle significantly greater than 90° within the plane defined by arms 5 and 7 which plane is normal to the axis of coil 23. The coil spring 22 includes coil 24, arm 6 with bent end 10 and arm 8 with bent end 12, each of which are similarly constructed as the corresponding elements of coil spring 21.

In FIG. 4, there is shown assembled compling spring 1 of the present invention, which is formed by coil springs 21 and 22 axially aligned and secured to one another by clamps such as 25 and 26. The coil 24 of coil spring 22 has a diameter slightly greater than that of coil 23. The coil 23 is snapped into the circular cavity within coil 24 and then two coils are clamped to one another by clamps 25 and 26. The arms 5, 6, 7 and 8 are aligned on a common plane normal to the axis of central coil 4 as arm 6 is laid upon arm 5 while arm 7 is laid upon arm 8. It may be understood that the angle between arms 5 and 7, and that between arms 6 and 8 should be made greater than 90° so that a sizable amount of torque is exerted on arms 5, 6, 7 and 8 when bent ends 9, 10, 11 and 12 are forced into holes 13, 14, 15 and 16, respectively. This torque restrains arms of the coupling spring 1 from disengaging from mating holes disposed within elongated members 2 and 3 as shown in FIG. 2.

Figure 5:
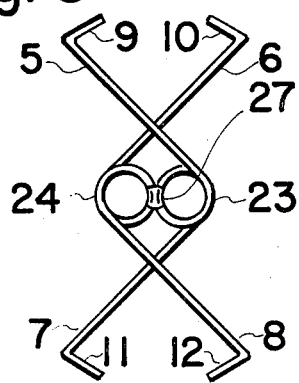
FIG. 5 illustrates another embodiment of assembling the coupling spring of the present invention.

In FIG. 5, there is shown another embodiment of forming the coupling spring by using the pair of coil springs 21 and 22 shown in FIG. 3. Coils 23 and 24 having the same diameter is secured to one another in tandem by using clamp 27 in such a way that arms 5 and 6, and arms 7 and 8 cross each other.

Figure 6:
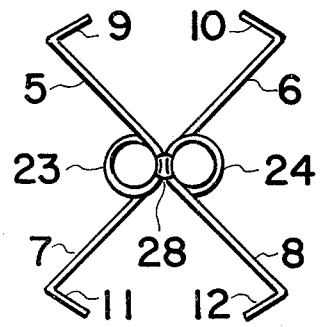
FIG. 6 illustrates still another embodiment of assembling the coupling spring of the present invention.

Still another embodiment of forming the coupling spring is illustrated in FIG. 6, where coils 23 and 24 are secured to one another in tandem by using clamp 28 in such a way that arms 5, 6, 7 and 8 extend radially from a single point at which two coils are clamped together.

While the principles of the invention have now been made clear in an illustrative embodiment, there will be immediately obvious to those skilled in the art many modifications of structure, arrangement, proportions, the elements, materials, and components used in the practice of the invention which are particularly adapted for specific environments and operating requirements without departing from those principles.

I claim:

1. A self-attaching coupling spring for coupling a pair of elongated members used for grasping, said coupling spring comprising:

a. a first coil spring having a first pair of arms extending therefrom, the end of each of said first pair of arms is bent in direction generally same as said arm is straightened with respect to the extension of said arm forming said first coil spring, b. a second coil spring having a second pair of arms extending therefrom, the end of each of said second pair of arms is bent in direction generally same as said arm is straightened with respect to the extension of said arm forming said second coil spring; and c. means for attaching said first and second coil springs to one another in axial alignment wherein the general direction of said first pair of arms is opposite to the general direction of said second pair of arms.

2. The combination as set forth in claim 1 wherein said bending of said ends of said arms are aligned within the common plane defined by said arms, said common plane being normal to the axis of said first and second coil springs attached to one another.

3. The combination as set forth in claim 2 wherein said first and second coil springs are attached to one another in coaxial alignment.

4. The combination as set forth in claim 3 wherein said first coil spring is fitted into the circular cavity within said second coil spring.

5. The combination as coil forth in claim 2 wherein said first and second coils springs are attached to one another in tandem; wherein one of said first pair of arms crosses one of said second pair of arms and the other of said first pair of arms crosses the other of said second pair of arms.

6. The combination as set forth in claim 2 wherein said first and second coil springs are attached to one another in tandem; wherein none of said first pair of arms crosses any one of said second pair of arms.

* * * * *